(12) United States Patent
Hodkinson et al.

(10) Patent No.: US 7,039,835 B2
(45) Date of Patent: May 2, 2006

(54) DROP-OUT MANAGEMENT SYSTEM AND METHOD

(75) Inventors: Allan Hodkinson, Bristol (GB); Rafel Jibry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 10/188,336

(22) Filed: Jul. 3, 2002

(65) Prior Publication Data

US 2003/0039048 A1 Feb. 27, 2003

(30) Foreign Application Priority Data

Jul. 7, 2001 (GB) .................................. 0116654

(51) Int. Cl.
*G06F 11/00* (2006.01)
(52) U.S. Cl. .................. 714/42; 369/53.32; 369/53.35; 714/818
(58) Field of Classification Search .................... 714/1, 714/818, 42; 369/53.32, 53
See application file for complete search history.

(56) References Cited

U.S. PATENT DOCUMENTS

| 4,037,050 | A * | 7/1977 | Lefkowitz et al. ........ 178/69 G |
| 4,409,628 | A * | 10/1983 | Frimet et al. ............ 360/73.09 |
| 6,292,317 | B1 * | 9/2001 | Alexander .................... 360/31 |
| 6,640,328 | B1 * | 10/2003 | DiMeo et al. .............. 714/818 |
| 2003/0117919 | A1 * | 6/2003 | Tatsuta ..................... 369/53.19 |

FOREIGN PATENT DOCUMENTS

| EP | 0284291 A2 | 9/1988 |
| EP | 0 596 626 B1 | 5/1994 |
| EP | 0 739 010 A2 | 10/1996 |
| JP | 60-127573 A | 7/1985 |

* cited by examiner

*Primary Examiner*—Bryce P. Bonzo

(57) ABSTRACT

Drop-outs in a data read channel having one or more controllable elements are managed. A data read channel derives a signal having at least one drop-out characterising parameter from which data are to be recovered. The signal from the data read channel is tapped and compared with at least one drop-out characterising parameter of the tapped signal with two or more thresholds to categorise the drop-out. One or more elements of the data read channel is controlled in response to the category of the drop-out.

25 Claims, 1 Drawing Sheet

DROP-OUT MANAGEMENT SYSTEM AND METHOD

Figure 1:
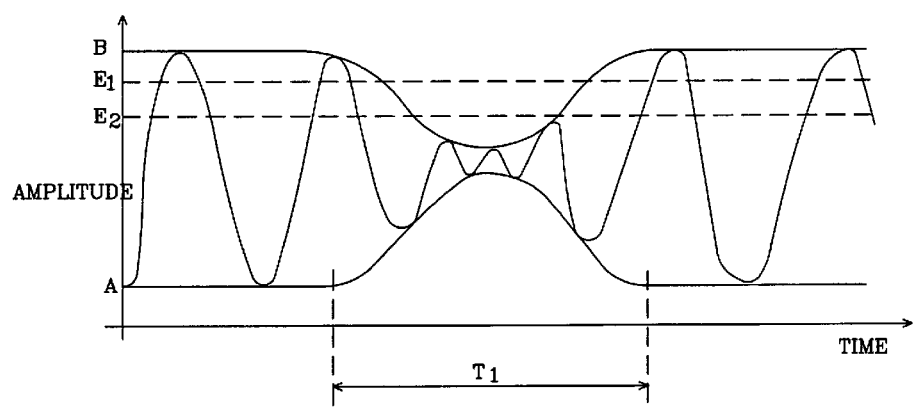

This invention relates to a drop-out management system and method for managing drop-outs in a data read channel carrying a signal from which data is to be recovered. The invention further relates to a data management system and method of managing data. The invention extends in general to apparatus and methods for processing data in communication channels.

In a magnetic tape drive a signal is recovered from the tape by a magnetic transducer read head connected to a data read channel. The signal is fed to the data read channel which adaptively filters and processes the signal to recover data from the signal. In normal operation, the recovered signal has a substantially uniform signal envelope amplitude and a good signal to noise ratio: data can be readily recovered. However, the quality of the signal can deteriorate leading to a so-called signal drop-out. Typically, a signal drop-out is characterised by a drop in the signal amplitude received by the read head. One cause of signal drop-out is an increase in the physical distance between the read head and the tape due to tape movement. Another cause is poor tape quality resulting in non-uniform signal strength along the length of the tape.

Signal drop-out is a well known problem which occurs when processing data being recovered from a signal derived from not only magnetic recording media but also optical recording media. Conventionally, in the event of a signal drop-out, a data read channel will react by noting that a signal drop-out has occurred and forcing one or more blocks or elements of the data read channel into a set recovery strategy in response to the drop-out event. Conventional approaches do no more than provide drop-out detection and attempt to compensate for a drop-out event once the event has occurred.

The measures taken by a conventional system to compensate for a signal drop-out are not always appropriate and can cause the channel to fail. No import is attached to the nature of a drop-out so only a single recovery strategy for the channel is ever employed in response to a drop-out event, irrespective of its nature.

It is an object of the present invention to seek to provide a drop-out management system and method of managing drop-outs which does not suffer from the above mentioned problems.

Accordingly, one aspect of the present invention provides a method of managing drop-outs in a data read channel having one or more controllable elements, the method comprising the steps of: providing on a data read channel, a signal from which data is to be recovered, the signal having at least one drop-out characterising parameter; tapping the signal from the data read channel; comparing the at least one drop-out characterising parameter of the tapped signal with two or more thresholds to categorise the drop-out; and controlling one or more elements of the data read channel in response to the category of the drop-out.

Advantageously, the drop-out characterising parameter comprises at least one of the following parameters: signal envelope amplitude; signal envelope amplitude rate of change; duration of a drop-out characterising parameter at a predetermined level; and duration of a drop-out characterising parameter past a predetermined threshold.

Preferably, comparing the at least one drop-out characterising parameter of the tapped signal with more than two thresholds to categorise more precisely the drop-out.

Conveniently, the respective controllable elements are further controlled in dependence of the severity of the drop-out.

Advantageously, the controllable elements of the data read channel have a plurality of modes of operation which are respectively selectable in response to the determined category of the drop-out.

Preferably, the method comprises the further step of sampling the tapped signal and deriving the at least one drop-out characterising parameter from the sampled signal.

Conveniently, the method comprises the further step of marking a data stream output from the data read channel to indicate data lost during the drop-out.

Advantageously, a first drop-out category is defined when the value of the drop-out characterising parameter crosses one threshold and lies between the thresholds and a second category is defined when the value of the drop-out characterising parameter crosses both thresholds, the first category being a mild drop-out and the second category being a severe drop-out.

Another aspect of the present invention provides a drop-out management system for managing drop-outs in a data read channel having one or more controllable elements, the system comprising a data read channel having one or more controllable elements, a signal analyser operable to tap a signal from which data is to be recovered from the data read channel and compare at least one drop-out characterising parameter of the tapped signal with two thresholds to categorise the drop-out; and a controller operable to control one or more elements of the data read channel in response to the category of the drop-out.

Conveniently, the signal analyser comprises a drop-out detector operable to monitor drop-out characterising parameters of the tapped signal.

Advantageously, the signal analyser is connected to the data read channel after a preamplifier of the data read channel and before any other elements of the data read channel.

Preferably, the signal analyser is connected to the data read channel after an automatic gain control circuit of the data read channel and before an adaptive filter and timing recovery circuit of the data read channel.

Conveniently, the signal analyser is connected to the data read channel before an analogue to digital converter of the data read channel, the system further comprising an analogue to digital converter interposed between the data read channel and the signal analyser.

Figure 2:
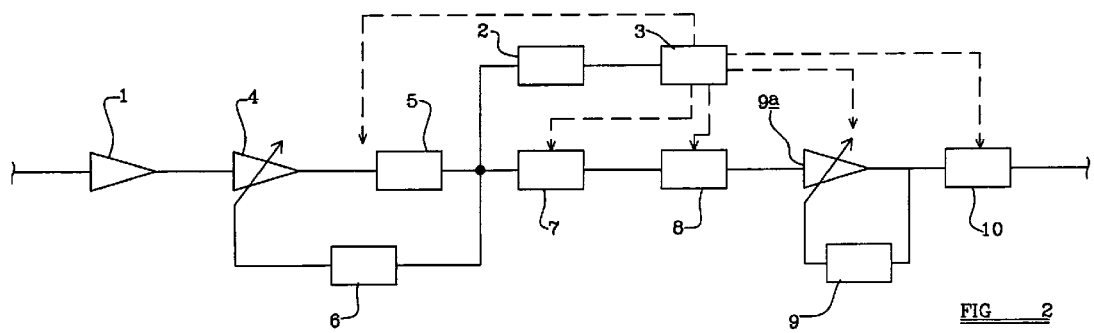

In order that the present invention may be more readily understood, embodiments thereof will now be described, by way of example, with reference to the accompanying drawings, in which:

FIG. 1 is a schematic representation of a signal trace showing a drop-out event; and FIG. 2 is a schematic block diagram of a drop-out management system embodying the present invention.

Referring now to FIG. 1, a signal read from a recording medium, in this case a magnetic tape, has an amplitude which in normal stable conditions varies between signal levels A and B. In normal operation, therefore, the signal has a substantially uniform and constant signal envelope which extends between the signal levels A and B. When a drop-out occurs, the signal envelope is altered. An example of such a drop-out is illustrated in FIG. 1 which shows how the signal envelope is constricted as the amplitude of the received signal drops dramatically and then subsequently recovers after the drop-out to the normal uniform signal envelope. The drop-out has a duration of $T_1$. In a conventional drop-out detection system implemented on a data read channel, once the signal envelope or amplitude of the signal crosses a predetermined threshold, the system would react to compensate for the drop-out, typically by instructing an automatic gain control circuit of the data read channel to increase its gain to maintain the signal amplitude at its normal level. In the case of a severe drop-out, the attempt to maintain signal amplitude will also increase the noise in the system and an adaptive filter in the data read channel will adapt its coefficients to compensate. This can cause the filter coefficients to change to one of a number of undesired stable states so that, after the drop-out has passed, the filter will not readapt its coefficients and subsequent data will be lost, even though the drop-out is over.

Turning now to FIG. 2, an exemplary data read channel is provided with a pre-amplifier 1 a drop-out detector 2 and a controller 3. The elements and structure of the data read channel are otherwise conventional. The data read channel shown in FIG. 2 comprises the following further elements: an automatic gain control circuit comprising a variable gain amplifier 4, an analogue to digital converter 5 and a feedback loop incorporating automatic gain control 6; a filter 7 comprising a finite impulse response filter; a timing recovery circuit 8 (Phase Locked Loop); a digital automatic gain control circuit 9 incorporating a variable gain amplifier 9a and automatic gain control; and an adaptive filter 10.

The elements making up the data read channel have different sensitivities to drop-outs. Some of the elements are drop-out tolerant and can be left to run free during a drop-out whereas other elements will need to be reset. For example, in a mild drop-out, the timing recovery circuit 8 may just need to be given a faster bandwidth for a pre-determined period of time so it can track the drop-out. However, in the case of a severe drop-out, the timing recovery circuit may need to be reset completely since it would be impossible to track such a severe drop-out. Adaptation of the adaptive filter 10 would probably need to be halted for both a mild drop-out or a severe drop-out. Conventional drop-out detection requires all the elements in the data channel to be controlled in the same manner during a drop-out. No allowance is made for the different sensitivities of the respective elements in the data channel to drop-outs. The present invention recognises the different sensitivities of the elements in the data read channel to drop-outs and provides a means to allow the data read channel to recover more quickly thereby losing less data during a drop-out and minimising any chances of error propagation.

The signal analyser 2 comprises a drop-out detector which is preferably connected to the data read channel after the automatic gain control circuit elements 4, 5, 6 and before the filter 7. At this point in the data read channel, the signal has been converted to a digital signal by the analogue to digital converter 5. The signal analyser 2 incorporates a comparator and sets at least two thresholds which serve to define the nature of the drop-out being experienced by the data read channel and which are discussed in greater detail later. The controller 3 receives from the signal analyser 2 information relating to the nature of the drop-out and, in dependence on that information, controls one or more of the elements of the data read channel to minimise the effect of the drop-out on the data read channel.

The signal analyser 2 taps into the signal from the data read channel at a fairly early stage so that any action taken by the controller 3 in response to a drop-out will be effective and will be relevant to the signal being processed in the later downstream elements of the data read channel which in the present example comprise the filter 7, the timing recovery circuit 8, the digital automatic gain control circuit 9 and the adaptive filter 10. The signal analyser 2 can be located further downstream in the data channel but it is preferable to tap the signal from the data read channel as early as possible. It is possible to pick off the signal earlier in the data read channel, for example before the automatic gain control circuit—after the preamplifier. At that stage, the tapped signal would still be an analogue signal so an analogue to digital converter would need to be interposed between the preamplifier and the signal analyser 2 so that the signal analyser is fed with a sampled digital signal or an analogue version of the analyser 2 would need to be employed.

Referring again to FIG. 1, the signal analyser 2 sets at least two thresholds. The two thresholds in this example are signal envelope amplitude levels $E_1$ and $E_2$. The first threshold $E_1$ is set below the normal signal envelope amplitude B and demarks a system tolerance limit within which normal operation of the data read channel can be maintained even if the signal envelope amplitude lowers to the first threshold. The second signal envelope amplitude threshold $E_2$ is set below the first threshold $E_1$ and is set at a level below which the signal envelope amplitude is indicative of a severe drop-out but above which the signal envelope amplitude is indicative only of a mild drop-out. It should be noted that the precise settings for the thresholds are determined by the relative sensitivities of the elements of the data read channel to drop-outs. Thus, the thresholds are set at levels at which the sensitivity of the controllable elements of the data read channel enter a transition region with regard to their operational performance depending on the nature of the drop-out. The present example categorises drop-outs into two categories: a mild drop-out represented by a signal envelope amplitude lying between the first and second thresholds $E_1$, $E_2$; and a severe drop-out characterised by a signal envelope amplitude dropping below the second threshold $E_2$.

The signal analyser 2 can also operate with further thresholds in respect of the same parameter, the signal envelope amplitude, so as to provide better resolution of drop-outs (i.e. more drop-out categories) and thereby control more accurately the controllable elements of the data read channel. The signal analyser is also operable to categorise drop-outs using other drop-out characterising parameters in addition to, in combination with or instead of the signal envelope amplitude parameter. Other parameters for which the signal analyser 2 can have thresholds set comprise the rate of change of the signal envelope amplitude, the time duration of a drop-out and the time duration for which a drop-out characterising parameter remains at, above or below a predetermined level.

The manner in which the controllable elements of the data read channel are controlled in response to the category of drop-out identified by the signal analyser 2 is entirely dependent upon the data read channel application, the modes of operation available to the respective elements and the degree of controls desired by the channel designer. However, by way of illustration, upon detection by the signal analyser 2 of a mild drop-out falling between the two example thresholds $E_1$ and $E_2$, the timing recovery circuit 8 is controlled by the controller 3 to give a faster bandwidth so that it can track the drop-out whereas the adaptive filter 10 is kick started with a known set of coefficients. In contrast, if a severe drop-out is detected in which the signal envelope amplitude falls below the second threshold $E_2$, the timing recovery circuit 8 is reset by the controller 3 and the adaptive filter 10 is kick started. Other control options would be to put the automatic gain control circuits 4, 5 and 6, and 9 respectively into acquisition mode in response to a severe drop-out.

Typically, in a drop-out characterised by the signal analyser 2 as a severe drop-out, it is assumed that all elements of the data read channel would fail, so they are put into recovery mode.

Thus, it can be seen that by categorising the drop-outs one can take advantage of the different sensitivities of the elements of the data read channel to drop-outs and control each of those elements in the most appropriate manner to compensate for or minimise the effect of drop-outs thereby providing a tailored recovery strategy with optimal control of the elements of the data read channel.

Mild drop-outs may and severe drop-outs will result in data being lost. To maximise the reliability of data recovery, it is extremely useful for the rest of the signal processing apparatus downstream of the data read channel to be aware of the fact that data is missing, particularly any error correction or recovery circuitry downstream of the data read channel. Accordingly, in an embodiment of the present invention, the controller 3 is operable to write data into the data stream being output from the data read channel to mark data erasures which occurred during particular categories of drop-out, most notably, severe drop-outs. This information is invaluable to the downstream signal processing, error correction and error recovery function of the system.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of managing drop-outs in a data read channel having one or more controllable elements for processing and outputting a signal from which data are to be recovered, the signal having at least one drop-out characterising parameter, the method comprising:
   tapping the signal from the data read channel;
   setting at least two thresholds to categorise drop-outs;
   comparing the at least one drop-out characterising parameter of the tapped signal with said at least two thresholds to categorise a drop-out; and
   controlling one or more of the controllable elements of the data read channel in response to the category of the drop-out.

2. A method according to claim 1, wherein the drop-out characterising parameter comprises at least one of the following parameters:
   signal envelope amplitude;
   signal envelope amplitude rate of change;
   duration of a drop-out characterising parameter at a predetermined level; and
   duration of a drop-out characterising parameter past a predetermined threshold.

3. A method according to claim 1 comprising the further step of comparing the at least one drop-out characterising parameter of the tapped signal with more than two thresholds to categorise more precisely the drop-out.

4. A method according to claim 3, wherein the respective controllable elements are further controlled in dependence of the severity of the drop-out.

5. A method according to claim 1, wherein the controllable elements of the data read channel have a plurality of modes of operation which are respectively selectable in response to a determined category of a drop-out.

6. A method according to claim 1, comprising the further step of sampling the tapped signal and deriving the at least one drop-out characterising parameter from the sampled signal.

7. A method according to claim 1, comprising the further steps of: marking a data stream output from the data read channel to indicate data lost during a drop-out.

8. A method according to claim 1, wherein a first drop-out category is defined in response to the value of the drop-out characterising parameter lying between two thresholds and a second category is defined in response to the value of the drop-out characterising parameter crossing both thresholds, the first category being a mild drop-out and the second category being a severe drop-out.

9. A method according to claim 1, wherein the one or more controllable elements is located downstream of a detector, the detector being operable to recover data from the signal having at least one drop-out characterising parameter, the controlling step being performed on one or more controllable elements downstream of the detector.

10. A method according to claim 1, wherein the thresholds are set and the comparing step is performed so that the category of the drop-out is determined by the severity of the drop-out.

11. A drop-out management system for managing drop-outs in a data read channel, the system comprising a data read channel having one or more controllable elements for processing and outputting a signal from which data are to be recovered, a signal analyser operable to tap the signal from the data read channel and compare at least one drop-out characterising parameter of the tapped signal with two thresholds to categorise the drop-out, and a controller operable to control at least one of the controllable elements of the data read channel in response to the category of the drop-out.

12. A system according to claim 11, wherein the signal analyser comprises a drop-out detector operable to monitor drop-out characterising parameters of the tapped signal.

13. A system according to claim 11, wherein the data read channel has a preamplifier and the signal analyser is connected to the data read channel after the preamplifier and before any other elements of the data read channel, at least one of the other elements being at least one of the controllable elements.

14. A system according to claim 11, wherein the data read channel has an automatic gain control circuit, an adaptive filter and a timing recovery circuit, wherein the signal analyser is connected to the data read channel after the automatic gain control circuit and before the adaptive filter and the timing recovery circuit, at least one of the adaptive filter and the timing recovery circuit being at least one of the controllable elements.

15. A system according to claim 11, wherein the data read channel has a first analogue to digital converter and the signal analyser is connected to the data read channel before the first analogue to digital converter, the system further comprising a second analogue to digital converter interposed between the data read channel and the signal analyzer, the first analog to digital converter being at least one of the controllable elements.

16. A method according to claim 11, wherein the thresholds and the analyzer are such that the comparison is adapted to cause the category of the drop-out to be determined by the severity of the drop-out.

17. A method of managing drop-outs in a data read channel having one or more controllable elements for processing and outputting a signal from which data are to be recovered, the signal having at least one drop-out characterising parameter from which the likely occurrence of a drop-out in the signal can be determined, the method comprising:

setting at least two thresholds to categorise drop-outs;

tapping the signal from the data read channel;

comparing the at least one drop-out parameter of the tapped signal with said at least two thresholds to categorise a drop-out; and controlling at least one of the controllable elements of the data read channel in response to the category of the drop-out, wherein at least one of the controllable elements of the data read channel has a plurality of modes of operation which are respectively selectable in response to a determined category of a drop-out.

18. A method according to claim 17, wherein the thresholds are set and the comparing step is performed so that the category of the drop-out is determined by the severity of the drop-out.

19. A drop-out management system for managing drop-outs in a data read channel, the system comprising: a data read channel having at least one controllable element for processing and outputting a signal from which data are to be recovered; means to tap the signal from the data read channel; means to compare at least one drop-out characterising parameter of the tapped signal with two thresholds; means coupled with an output of the means to compare to categorise the drop-out; and means to control the at least one controllable element of the data read channel in response to the category of the drop-out.

20. A method according to claim 19, wherein the thresholds and the means to compare are such that the means to compare is adapted to cause the category of the drop-out to be determined by the severity of the drop-out.

21. A drop-out management system for managing drop-outs in a data read channel, the system comprising a data read channel having at least one controllable element located downstream of a detector, the detector being operable to recover data from a signal, a signal analyser operable to tap the signal from the data read channel and compare at least one drop-out characterising parameter of the tapped signal with two thresholds to categorise the drop-out, and a controller operable to control the at least one of controllable element downstream of the detector in response to the category of the drop-out.

22. A method according to claim 21, wherein the thresholds and the analyzer are such that the comparison is adapted to cause the category of the drop-out to be determined by the severity of the drop-out.

23. A method of managing drop-outs in a data read channel having one or more controllable elements for processing and outputting a signal from which data are to be recovered, the signal having plural drop-out characterising parameters, the method comprising:

tapping the signal from the data read channel;

comparing the plural drop-out characterising parameters of the tapped signal with drop-out values associated with each of the drop-out characterizing parameters to categorise a drop-out; and controlling one or more of the controllable elements of the data read channel in response to the category of the drop-out.

24. A method according to claim 23, wherein the plural drop-out characterising parameters comprise at least two of the following parameters:

signal envelope amplitude;

signal envelope amplitude rate of change;

duration of a drop-out characterising parameter at a predetermined level; and duration of a drop-out characterising parameter past a predetermined threshold.

25. Apparatus for performing the method of claim 23.

\* \* \* \* \*